(12) United States Patent
Shimizu et al.

(10) Patent No.: US 8,468,801 B2
(45) Date of Patent: Jun. 25, 2013

(54) METHOD AND SYSTEM FOR WARMING UP CATALYTIC CONVERTER FOR CLEANING UP EXHAUST GAS

(75) Inventors: Masahiro Shimizu, Tomioka (JP); Kazuhiko Shinagawa, Inzai (JP)

(73) Assignee: IHI Corporation, Tokyo (JP)

( * ) Notice: Subject to any disclaimer, the term of this patent is extended or adjusted under 35 U.S.C. 154(b) by 340 days.

(21) Appl. No.: 12/933,634

(22) PCT Filed: Mar. 9, 2009

(86) PCT No.: PCT/JP2009/054439
§ 371 (c)(1),
(2), (4) Date: Sep. 20, 2010

(87) PCT Pub. No.: WO2009/116416
PCT Pub. Date: Sep. 24, 2009

(65) Prior Publication Data
US 2011/0016855 A1    Jan. 27, 2011

(30) Foreign Application Priority Data

Mar. 19, 2008   (JP)  ............................ 2008-071756
Jun. 12, 2008   (JP)  ............................ 2008-154215

(51) Int. Cl.
*F01N 3/00*    (2006.01)

(52) U.S. Cl.
USPC .................. 60/284; 60/274; 60/280; 60/287; 60/289; 60/293; 60/601

(58) Field of Classification Search
USPC .................. 60/274, 278, 280, 284, 285, 287, 60/288, 289, 293, 299, 601
See application file for complete search history.

(56) References Cited

U.S. PATENT DOCUMENTS

| | | | |
|---|---|---|---|
| 6,594,990 B2 * | 7/2003 | Kuenstler et al. ............... | 60/295 |
| 6,637,204 B2 * | 10/2003 | Ellmer et al. .................... | 60/606 |
| 6,935,100 B2 * | 8/2005 | Miura ............................. | 60/284 |
| 7,178,327 B2 * | 2/2007 | Miyashita ....................... | 60/285 |
| 7,208,029 B2 * | 4/2007 | Shirakawa et al. ............. | 95/273 |
| 7,415,966 B2 * | 8/2008 | Irisawa .......................... | 123/431 |
| 8,087,232 B2 * | 1/2012 | Miyashita et al. .............. | 60/280 |
| 2005/0132813 A1 | 6/2005 | Aratani et al. | |

FOREIGN PATENT DOCUMENTS

| | | |
|---|---|---|
| CN | 1920268 | 2/2007 |
| DE | 196 39 146 | 11/1997 |
| DE | 10 2004 059 397 | 6/2006 |
| EP | 1 524 417 | 4/2005 |
| JP | 2002-206446 | 7/2002 |
| JP | 2003-227341 | 8/2003 |

(Continued)

*Primary Examiner* — Binh Q Tran
(74) *Attorney, Agent, or Firm* — Cozen O'Connor

(57) ABSTRACT

A warming-up system performing a catalytic converter warming-up method has an electric motor (1*m*) enabling a turbocharger (1) to increase the amount of air supplied to an internal combustion engine (2) regardless of the amount of exhaust gas flowing through a turbine (1*t*) of the turbocharger (1), a variable nozzle (1*n*) regulating the flow of exhaust gas through the turbine (1*t*), and an ECU (5) for controlling the operation of the electric motor (1*m*) and the variable nozzle (1*n*) and the amount of fuel supplied to the internal combustion engine (2). After the internal combustion engine (2) is started, the ECU (5) warms up the catalytic converter (4) by driving the electrical motor (1*m*) to forcibly rotate the turbine (1*t*), opening the variable nozzle (1*n*), and increasing fuel supply to the internal combustion engine (2).

11 Claims, 11 Drawing Sheets

FOREIGN PATENT DOCUMENTS

| | | |
|---|---|---|
| JP | 2004-150392 | 5/2004 |
| JP | 2005-23822 | 1/2005 |
| JP | 2007-270731 | 10/2007 |
| JP | 2007-278252 | 10/2007 |
| WO | WO 2006/056393 | 6/2006 |
| WO | WO 2006/123836 | 11/2006 |

* cited by examiner

METHOD AND SYSTEM FOR WARMING UP CATALYTIC CONVERTER FOR CLEANING UP EXHAUST GAS

RELATED APPLICATIONS

This is a U.S. National Phase Application under 35 USC §371 of International Application PCT/JP2009/054439 filed on Mar. 9, 2009.

This application claims the priority of Japanese Patent Application Nos. 2008-071756 filed Mar. 19, 2008 and 2008-154215 filed Jun. 12, 2008, the entire contents of both of which are hereby incorporated by reference.

TECHNICAL FIELD

This invention relates to a method and system for warming up a catalytic converter for cleaning up exhaust gas of an internal combustion engine.

BACKGROUND ART

Automobiles, etc. equipped with an internal combustion engine (hereinafter referred to simply as "engine"), such as a diesel engine or a gasoline engine, have a catalytic converter for cleaning up exhaust gas of the engine, and such catalytic converter contains catalysts, such as three-way catalysts. Such catalytic converter is not activated, thus does not exhibit its capacity to promote reduction or oxidation of exhaust gas unless it undergoes a temperature rise. Thus, temperature control over the catalytic converter is important.

Immediately after the engine is started, however, the temperature of the exhaust gas is low, so that it takes a certain time (warming-up time) for the catalytic converter to become activated, or in other words, rise to its activation temperature. In order to alleviate this problem, a measure to cause early activation of the catalytic converter is taken. Such measure is, for example heating the catalytic converter by a heater or increasing the idling speed of the engine immediately after starting the engine.

There are known, on the other hand, engines provided with a supercharger, in which the supercharger is used to increase the power output of the engine. A turbocharger, which is a type of supercharger, comprises a turbine rotated by kinetic energy of exhaust gas and a compressor driven by the turbine to compress air flowing toward the engine and deliver the compressed air to the engine.

In the engine provided with a turbocharger, the catalytic converter is arranged normally downstream of the turbocharger in the exhaust passage of the engine, so that the turbocharger absorbs thermal energy of exhaust gas according to its heat capacity, and reduces heat supplied to the catalytic converter. Consequently, engines with a turbocharger take longer time to warm up the catalytic converter, compared with engines without a turbocharger. Thus, in the engines with a turbocharger, how short the catalytic converter warming-up time can be made is important.

For example, Patent Document 1 discloses a turbocharger control device, which determines whether or not the catalytic converter needs warming, and if the catalytic converter needs warming, controls the revolving speed of the turbine, thereby reducing a difference between the pressure of exhaust gas at the inlet of the turbine, which will be referred to as "inlet pressure", and the pressure of exhaust gas at the outlet of the turbine, which will be referred to as "outlet pressure".

The above control device can reduce the difference between the inlet pressure and the outlet pressure to a level as close to zero as possible in a short time. Specifically, in the case that the turbocharger is a variable displacement turbocharger with a variable nozzle, the control device opens the vane of the variable nozzle to its maximum extent, thereby greatly reducing the difference between the inlet pressure and the outlet pressure. This results in a reduction in the velocity of exhaust gas flowing through the turbine, and therefore, a reduction in the thermal energy of exhaust gas consumed to rotate the turbine. This allows the catalytic converter to be efficiently warmed up in a short time.

PRIOR ART DOCUMENT

Patent Document 1: Japanese Patent Application KOKAI Publication 2007-278252

DISCLOSURE OF THE INVENTION

Problem to be solved by the Invention

The technical concept underlying the above control device is use of as much heat contained in exhaust gas as possible to warm up the catalytic converter. However, such effective use of exhaust gas entails a reduction in the velocity of exhaust gas flowing through the turbine, which leads to a reduction in the amount of compressed air supplied to the engine by the compressor. Such reduction in the amount of air calls for a reduction in the amount of fuel supplied to the engine in order to maintain a desired air-fuel ratio, thus resulting in a reduction in thermal energy of exhaust gas. Consequently, the available warming-up energy, namely the energy available to warm up the catalytic converter reduces, which does not allow effective reduction of the catalytic converter warming-up time.

A primary object of the present invention is to provide a warming-up method and system capable of shortening the catalytic converter warming-up time, thus early activation of the catalytic converter.

Means for Solving the Problem

The above object is achieved by a warming-up method according to the present invention. A catalytic converter to which this warming-up method is applied is arranged in an exhaust passage of an internal combustion engine with a turbocharger to clean up exhaust gas. The warming-up method according to the present invention comprises a first step of increasing an amount of air supplied to the internal combustion engine regardless of an amount of exhaust gas flowing through a turbine of the turbocharger; a second step of regulating the flow of exhaust gas through the turbine, thereby reducing loss of thermal energy which the exhaust gas flowing through the turbine and then toward the catalytic converter undergoes; and a third step of increasing fuel supply to the internal combustion engine or supplying oxygen into the exhaust gas, thereby increasing heat contained in the exhaust gas of the internal combustion engine or promoting catalyzed reaction on the catalytic converter.

Specifically, the second step may open a variable nozzle or a wastegate valve provided in association with a variable displacement turbocharger, and the third step may increase heat contained in the exhaust gas by increasing fuel supply to the internal combustion engine.

Alternatively, the third step may cause part of air to be supplied to the internal combustion engine to flow into the exhaust passage, upstream of the catalytic converter, thereby increasing heat contained in the exhaust gas or promoting catalyzed reaction on the catalytic converter.

The warming-up method according to the present invention can further comprise a fourth step of operating the turbocharger and the internal combustion engine in a normal operation control mode, after the catalytic converter has become activated.

The present invention also provides a catalytic converter warming-up system. This warming-up system comprises an intake regulation device for increasing an amount of air supplied to the internal combustion engine regardless of an amount of exhaust gas flowing through a turbine of the turbocharger; a turbine regulation device for regulating the flow of exhaust gas through the turbine, thereby reducing loss of thermal energy which the exhaust gas flowing through the turbine and then toward the catalytic converter undergoes; an exhaust gas regulation device for increasing fuel supply to the internal combustion engine or supplying oxygen into the exhaust gas, thereby increasing heat contained in the exhaust gas of the internal combustion engine or promoting catalyzed reaction on the catalytic converter; and a control device for controlling operation of the intake regulation device, the turbine regulation device and the exhaust gas regulation device.

Specifically, the turbine regulation device may include a variable nozzle or a wastegate valve, in which case the control device reduces the loss of thermal energy which the exhaust gas flowing toward the catalytic converter undergoes, by opening the variable nozzle or the wastegate valve.

The exhaust gas regulation device may increase fuel supply to the internal combustion engine. Alternatively, the exhaust gas regulation device may include a bypass passage connecting an intake passage, which supplies air to the internal combustion engine, and the exhaust passage, and a bypass valve for opening and closing the bypass passage, in which case the control device opens the bypass valve, thereby causing part of air to be supplied to the internal combustion engine to flow into the exhaust line to increase heat contained in the exhaust gas of the internal combustion engine or promote catalyzed reaction on the catalytic converter.

The warming-up system according to the present invention may further comprise a detector detecting whether or not the catalytic converter has become activated, in which case, when determining that the catalytic converter has become activated, from output of the detector, the control device starts operating the turbocharger and the internal combustion engine in a normal operation control mode.

The intake regulation device may include an electric motor connected to the turbocharger or an electric booster arranged upstream of the turbocharger in the intake passage, where the electric booster increases the amount of air supplied to the internal combustion engine.

Advantages of the Invention

In the above-described warming-up method and system according to the present invention, when the catalytic converter needs warming as at the time of starting the engine, available warming-up energy, namely the energy available to warm up the catalytic converter is increased by increasing heat contained in exhaust gas of the internal combustion engine or promoting catalyzed reaction on the catalytic converter. At the same time, the loss of thermal energy which the exhaust gas flowing toward the catalytic converter undergoes is reduced by regulating the flow of exhaust gas through the turbine of the turbocharger, which leads to a further increase in warming-up energy. This greatly shortens the time taken for warming up the catalytic converter, or in other words, enables early activation of the catalytic converter.

MODE OF CARRYING OUT THE INVENTION

Figure 1:
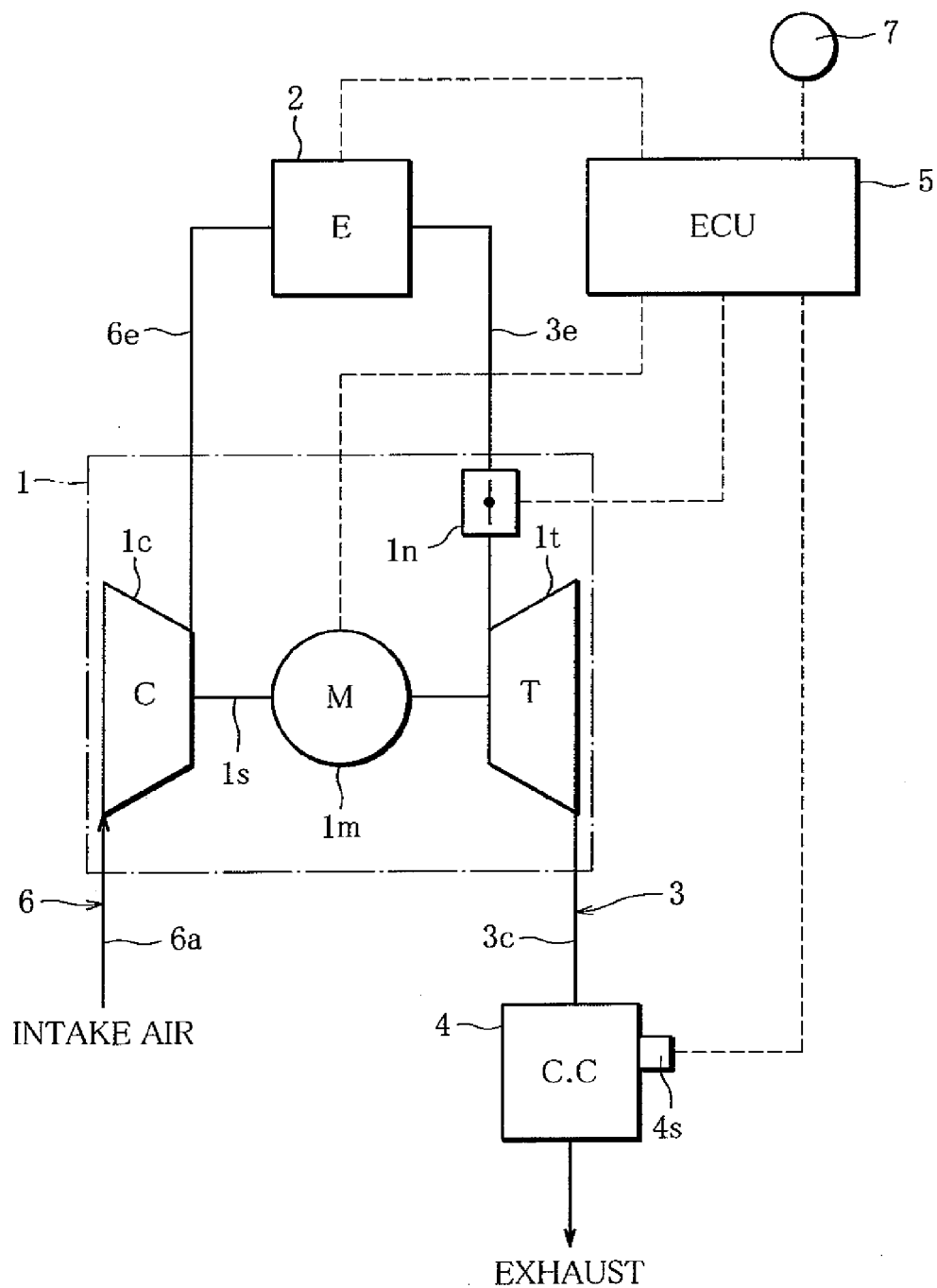
FIG. 1 is a diagram schematically showing a warming-up system according to a first embodiment of the present invention.

FIG. 1 is a diagram schematically showing a warming-up system according to a first embodiment of the present invention. This warming-up system is used to warm up a catalytic converter 4. The catalytic converter 4 has a function of cleaning up exhaust gas of an internal combustion engine (hereinafter referred to as "engine") 2 mounted on an automobile, and arranged in an exhaust passage 3 of the engine 2. The engine 2 may be either a diesel engine or a gasoline engine.

In the present embodiment, the catalytic converter 4 is a three-way catalytic converter capable of removing toxic substances (typically, hydrocarbons, carbon monoxide and nitrogen oxides) from exhaust gas. The warming-up system according to the present invention is however applicable to catalytic converters other than the three-way catalytic converter.

The engine 2 is provided with a turbocharger 1, and the turbocharger 1 includes a turbine 1t. The turbine 1t is arranged in the exhaust passage 3, upstream of the catalytic converter 4. Thus, the exhaust passage 3 is divided into a section 3e upstream of the turbine 1t and a section 3c downstream of the turbine 1t, and the catalytic converter 4 is arranged in the downstream section 3c.

The turbocharger 1 further includes a compressor 1c. The compressor 1c is connected to the turbine 1t by a common drive shaft 1s and arranged in an intake passage 6 of the engine 2. Thus, the intake passage 6 is divided into a section 6a upstream of the compressor 1c and a section 6e downstream of the compressor 1c. An intercooler (not shown) may be arranged in the downstream section 6e. The intercooler cools compressed air delivered to the engine 2.

The turbine 1t is rotated by kinetic energy of exhaust gas of the engine 2 flowing through the turbine 1t. The rotation of the turbine 1t is transmitted to the compressor 1c by the drive shaft 1s, so that the compressor 1c rotates. The rotation of the compressor 1c compresses and forces air to the engine 2 via the intake passage 6, so that the engine 2 is supplied with the compressed air. The turbocharger 1 can thus increase the power output of the engine 2.

The aforementioned warming-up system includes an electric motor 1m and a variable nozzle 1n. The electric motor 1m has an output shaft, and the output shaft is connected to the drive shaft 1s of the turbocharger 1 by means of an electromagnetic clutch (not shown). Thus, the drive shaft 1s is forcibly rotated when the driving force of the electric motor 1m is transmitted to the drive shaft 1s via the electromagnetic clutch. The electric motor 1m can therefore forcibly rotate the compressor 1c of the turbocharger 1, thereby increasing the amount of compressed air supplied to the engine 2, regardless of the amount of exhaust gas flowing through the turbine 1t. In other words, the electric motor 1m enables increment of the amount of air supplied to the engine 2, independent from the flow rate of exhaust gas.

The variable nozzle in is arranged at the inlet of the turbine 1t to regulate the amount of exhaust gas entering the turbine 1t. The turbocharger 1 provided with such variable nozzle in belongs to a family of variable displacement turbochargers.

The variable displacement turbocharger 1 controls the amount of exhaust gas entering the turbine 1t by opening and closing the variable nozzle 1n, thereby controlling the amount of compressed air supplied to the engine 2. Thus, the variable displacement turbocharger 1 can, by itself, greatly change the amount of compressed air supplied to the engine 2 and cover a wide operating range of the engine 2. In other words, the turbocharger 1 has good performance over a wide operating range of the engine 2.

It is to be noted that, in the present embodiment, the term "variable nozzle" is used as representative of all the variable mechanisms which make the turbocharger 1 variable in displacement. For example, variable mechanisms including a set of flaps or vanes are known as usable in place of the nozzle. Incidentally, in FIG. 1, the variable nozzle 1n is indicated as being opened.

The warming-up system further includes an electronic control unit (ECU) 5 serving as a control device. The ECU 5 is electrically connected to the electric motor 1m, the electromagnetic clutch and the variable nozzle 1n. The ECU is also connected to a detector 4s and an ignition key switch 7 of the engine 2.

Specifically, the detector 4s is attached to the catalytic converter 4 to send the ECU 5 a signal indicative of whether or not the catalytic converter 4 is activated. The detector 4s is, for example a temperature sensor or an oxygen concentration sensor. When the detector 4s is a temperature sensor, the detector 4s detects the temperature of the catalytic converter 4 and sends a temperature signal to the ECU 5. From the temperature signal, the ECU 5 determines whether or not the catalytic converter 4 has reached its activation temperature. When the catalytic converter 4 is a three-way catalytic converter, the activation temperature is between 200 and 300° C.

Since the temperature of the catalytic converter 4 is determined by the temperature of exhaust gas, the detector 4s, or temperature sensor may be arranged in the exhaust passage 3, immediately upstream or downstream of the catalytic converter 4. In this case, the detector 4s detects the temperature of exhaust gas as the temperature of the catalytic converter 4.

In the case that the detector 4s is an oxygen concentration sensor, the detector 4s is arranged in the exhaust passage 3, immediately downstream of the catalytic converter 4, and detects the oxygen concentration in the exhaust gas and sends a concentration signal to the ECU 5. From the concentration signal, the ECU 5 determines whether or not the catalytic convert 4 is functioning, or in other words, activated.

The detector 4s may be a gas sensor detecting the concentration of a gas other than oxygen, for example carbon dioxide.

The ECU 5 is electrically connected to a fuel supply device (not shown) of the engine 2, and by means of this fuel supply device, controls the amount of fuel supplied to the engine 2 on the basis of the amount of air supplied to the engine 2, thus, controls the air-fuel ratio. Specifically, when the engine 2 is in a normal operating region, the air-fuel ratio is controlled to a stoichiometric air-fuel ratio or a level close to it. In this state, the catalytic converter 4 can perform its function effectively.

In an operating region of the engine 2 for improving fuel efficiency and reducing toxic substances in the exhaust gas, however, the air-fuel ratio is controlled to an economic air-fuel ratio greater than the stoichiometric air-fuel ratio (lean mixture). In an operating region of the engine 2 for increasing the power output of the engine 2 as at the time of starting the engine 2, the air-fuel ratio is controlled to an acceleration air-fuel ratio less than the stoichiometric air-fuel ratio (rich mixture).

The aforementioned ECU 5 warms up the catalytic converter 4 by controlling the operating state of the electric motor 1m (determining whether to drive or stop it, and the revolving speed thereof) on the basis of signals from the detector 4s and the ignition key switch 7, and controlling the variable nozzle 1n to open or close. The details of the warming-up will be described later.

Figure 2:
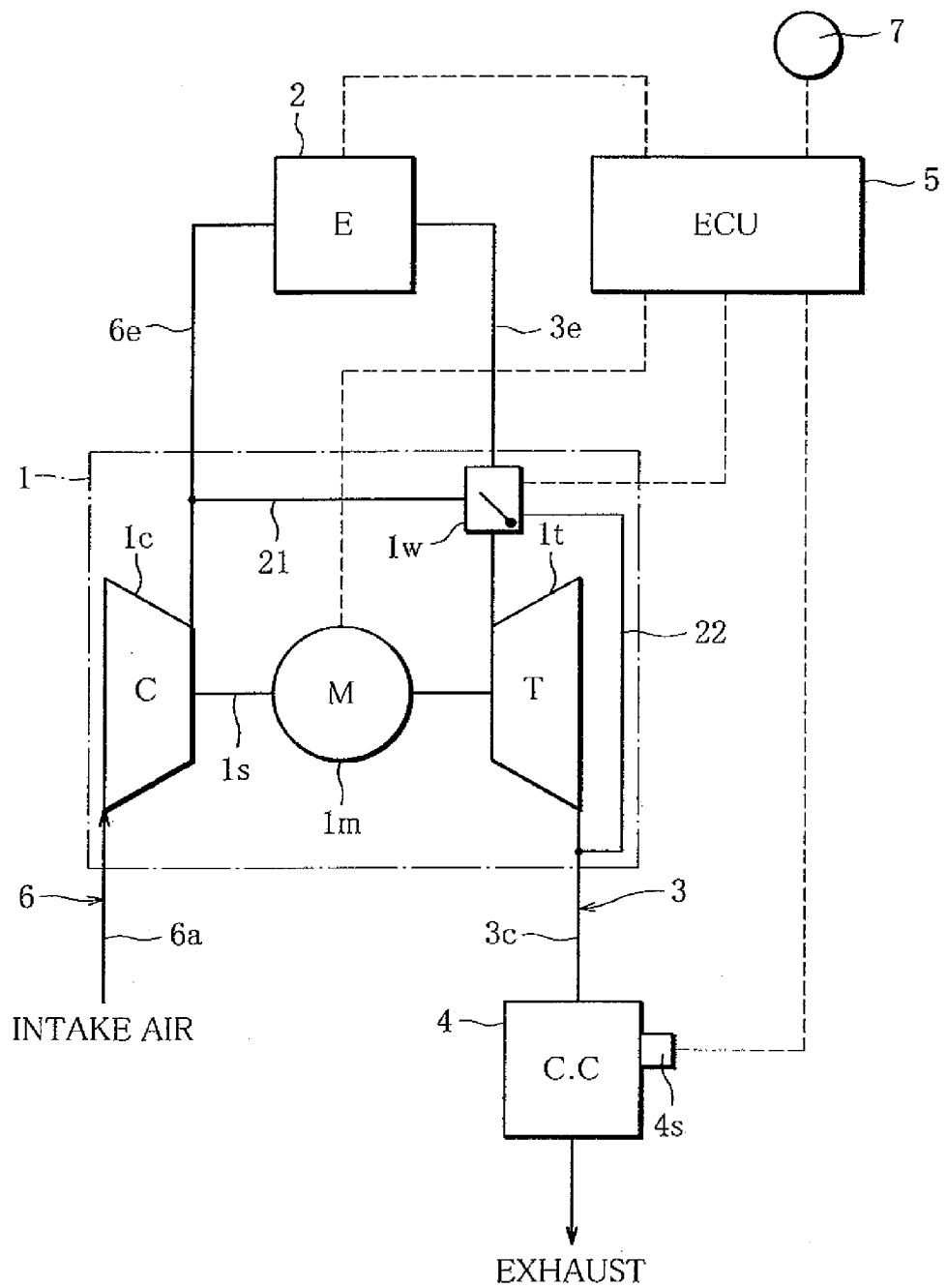
FIG. 2 is a diagram schematically showing a warming-up system according to a second embodiment of the present invention.

FIG. 2 schematically shows a warming-up system according to a second embodiment.

In FIG. 2, the same elements as those of the warming-up system according to the first embodiment are assigned the same reference characters. The description of those elements will be omitted. Also with respect to warming-up systems according to a third and subsequent embodiments, the same elements as those of the warming-up system according to the first embodiment are assigned the same reference characters in the drawings to avoid repetitive description.

The warming-up system of FIG. 2 includes a wastegate valve 1w in place of the aforementioned variable nozzle in. The wastegate valve 1w can regulate the amount of exhaust gas entering the turbine 1t. Specifically, the wastegate valve 1w is arranged in the exhaust passage 3, upstream of the turbine 1t. The wastegate valve 1W is connected to a branch passage 21 and a bypass passage 22. The branch passage 21 connects the wastegate valve 1w to the downstream section 6e of the intake passage 6, while the bypass passage 22 connects the wastegate valve 1w to the downstream section 3c of the exhaust passage 3, bypassing the turbine 1t.

Generally, the wastegate 1w functions as follows:

When the pressure of the compressed air in the intake passage 6 becomes too high, the wastegate valve 1w is opened to allow most of exhaust gas to flow through the wastegate valve 1w into the bypass passage 22 and then into the downstream section 3c of the exhaust passage 3, bypassing the turbine 1t. This reduces the revolving speed of the turbine 1t and thus the compressor 1c, thereby reducing the amount and pressure of compressed air delivered to the engine 2 by the compressor 1c. Opening the wastegate valve 1w therefore denotes reducing the amount of work done by the turbine 1t. Thus, the forcibly driving of the turbine 1t by the electric motor 1m at an optional revolving speed with the wastegate valve 1w opened does not result in any loss of thermal energy of exhaust gas flowing toward the catalytic converter 4.

Like the variable nozzle 1n, the wastegate valve 1w is electrically connected to the ECU 5 so that the ECU 5 can control the wastegate valve 1w to open and close.

Figure 3:
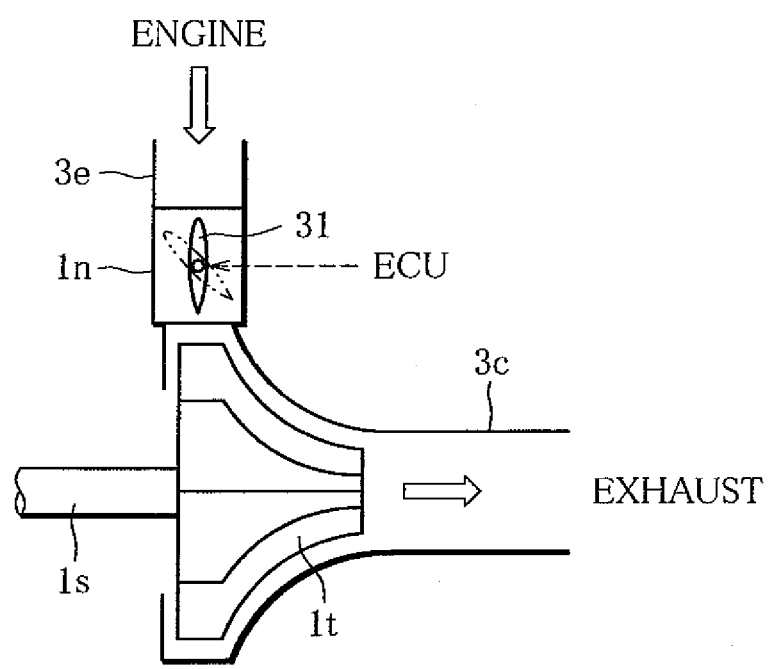
FIG. 3 is a diagram showing the details of a variable nozzle indicated in FIG. 1.

FIG. 3 shows the details of the variable nozzle in.

The variable nozzle in has a vane 31 rotatably arranged inside a housing of the turbine 1t. According to the actual arrangement, the vane 31 should show its back or front face in FIG. 3, but with a view to clarifying its function, the vane 31 of FIG. 3 is indicated in its airfoil shape.

With the vane 31 closed as indicated in chain line in FIG. 3, the variable nozzle an exerts a great resistance to the flow of the exhaust gas, so that the variable nozzle in reduces the amount of exhaust gas entering the turbine 1b and increases the velocity thereof. Conversely, with the vane 31 opened as indicated in solid line in FIG. 3, the variable nozzle in exerts a small resistance to the flow of the exhaust gas, so that the variable nozzle 1n increases the amount of exhaust gas entering the turbine 1b and reduces the velocity thereof.

Consequently, with the vane 31 opened, the thermal energy of exhaust gas consumed to rotate the turbine 1t is small, so that the loss of thermal energy which the exhaust gas flowing toward the catalytic converter 4 undergoes is small. Further, in this vane state, an increased amount of exhaust gas flows through the turbine t1, which allows the motor 1m to drive the turbine 1t and thus the compressor 1c at a revolving speed corresponding to the increased amount of exhaust gas. This increases the amount of compressed air supplied to the engine 2 by the compressor 1c, thus procuring a condition allowing increase of the amount of fuel supplied to the engine 2 to maintain a desired air-fuel ratio.

In order to enable the open/close-control of the vane 31 by the ECU 5, a motor (not shown) is connected to the rotating shaft of the vane 31. This motor is electrically connected to the ECU 5.

Figure 4:
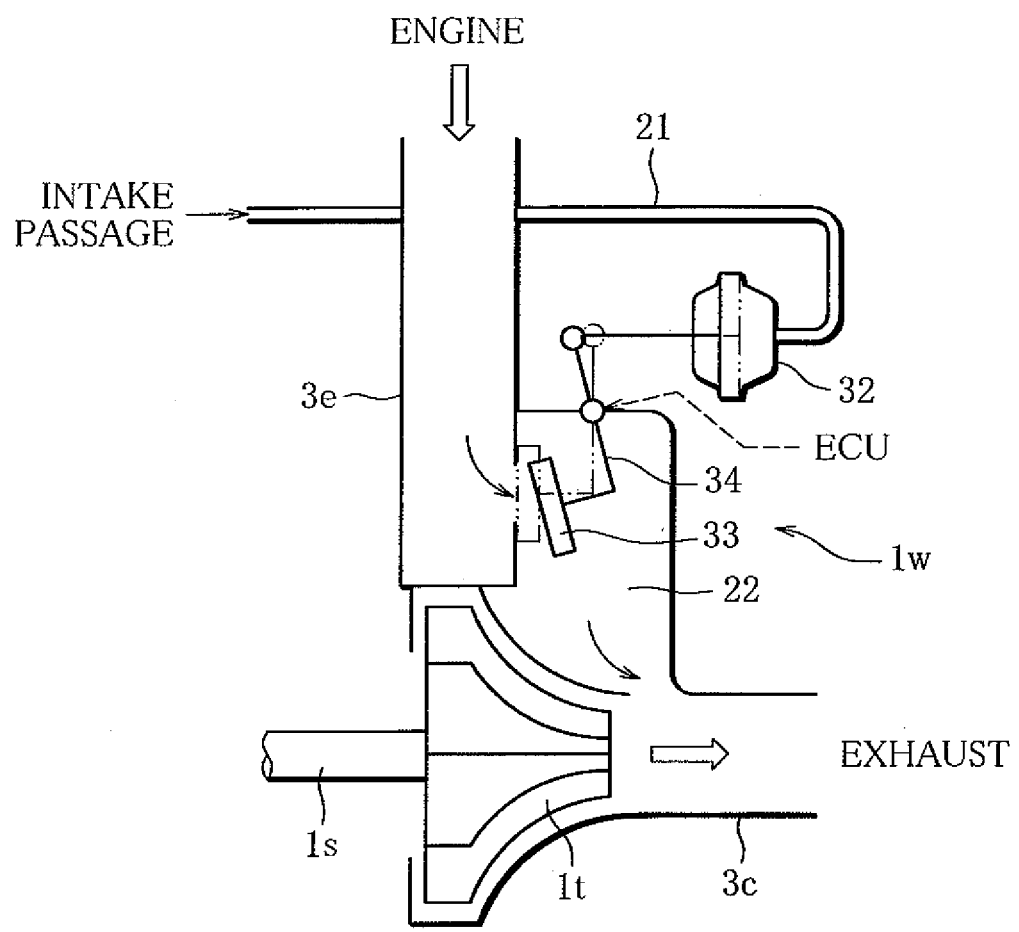
FIG. 4 is a diagram showing the details of a wastegate valve indicated in FIG. 2.

FIG. 4 shows the details of the wastegate valve 1w.

The wastegate valve 1w includes a pneumatic actuator 32 of diaphragm type and a valve element 33. The pneumatic actuator 32 is connected to the branch passage 21 so that air pressure in the downstream section 6e of the intake passage 6 is supplied to the pneumatic actuator 32 via the branch passage 21. The pneumatic actuator 32 has a rod which advances and draws back depending on the air pressure supplied to the pneumatic actuator 32. The valve element 33 is arranged in the upstream end of the bypass passage 22 and connected to the rod of the pneumatic actuator 32 by a link 34.

When the air pressure in the downstream section 6e of the intake passage 6 is low, the pneumatic actuator 32 presses the valve element 33 against the outer wall of the upstream section 3e of the exhaust passage 3 by means of the link 34, as indicated in chain line in FIG. 4, so that the valve element 33 closes an opening in the outer wall of the upstream section 3e to close the bypass passage 22.

Conversely, when the air pressure in the downstream section 6e is higher than a predetermined level, the pneumatic actuator 32 draws the valve element 33 away from the opening in the upstream section 3e by means of the link 34, as indicated in solid line in FIG. 4, thereby opening the bypass passage 22.

With the bypass passage 22 opened, exhaust gas flows from the upstream section 3e of the exhaust passage 3 to the bypass passage 22 and then to the downstream section 3c of the exhaust passage 3, bypassing the turbine 1t. Consequently, the amount of exhaust gas flowing through the turbine 1t is reduced, so that the loss of thermal energy which the exhaust gas flowing toward the catalytic converter 4 undergoes is reduced, as explained with respect to the variable nozzle 1n above. This means that, with the wastegate valve 1w opened, the electric motor 1m can drive the turbine 1t and thus the compressor 1c at an optional revolving speed without increasing the loss of thermal energy of the exhaust gas. This procures a condition allowing increase of the amount of fuel supplied to the engine 2, as in the above-described case.

In order to enable the open/close-control of the valve element 33 by the ECU 5, a motor (not shown) is connected to the rotating shaft of the link 34. This motor is electrically connected to the ECU 5.

Next, referring to a flowchart shown in FIG. 5, how the warming-up system according to the first or second embodiment warms up the catalytic converter 4 will be described.

When the engine 2 is started, the ECU 5 detects the starting of the engine 2 from a signal from the ignition key switch 7 at step S0, and starts driving of the electric motor 1m and simultaneously engages the electromagnetic clutch at subsequent step S1. Consequently, driving force is transmitted from the electric motor 1m to the drive shaft 1s of the turbocharger 1 via the electromagnetic clutch, to forcibly rotate the turbine 1t and compressor 1c of the turbocharger 1.

To sum up, step S1 causes rotation of the compressor 1c irrespective of the flow rate of exhaust gas. The compressor 1c compresses the air flowing in from the intake passage 6 and delivers the compressed air to the engine 2. Consequently, the engine 2 is supplied with an increased amount of air.

At subsequent step S2, the ECU 5 forcibly opens the variable nozzle 1n or the wastegate valve 1w. It is desirable that the variable nozzle 1n or the wastegate valve 1w be opened to its maximum extent.

As mentioned above, the opening of the variable nozzle 1n reduces the loss of thermal energy that the exhaust gas flowing toward the catalytic converter 4 undergoes, while the ECU 5 increases the revolving speed of the turbine 1t to a level corresponding to the amount of exhaust gas flowing through the turbine 1c (level not obstructing the flow of exhaust gas through the turbine 1t) by means of the electric motor 1m. As a result, the compressor 1c increases the amount of compressed air supplied to the engine 2.

The opening of the wastegate valve 1w also reduces the loss of thermal energy that the exhaust gas flowing toward the catalytic converter 4 undergoes. In this case, the ECU 5 can drive the turbine 1t and thus the compressor 1c at an optional revolving speed by means of the electric motor 1m, which enables a further increase in the amount of compressed air supplied to the engine 2 by the compressor 1c.

To sum up, step S2 reduces the loss of thermal energy that the exhaust gas flowing toward the catalytic converter 4 undergoes.

In response to an increase in the amount of compressed air supplied to the engine 2 resulting from step S2, the ECU 5 increases the amount of fuel supplied to the engine 2 at subsequent step S3, which results in an increase in heat contained in the exhaust gas.

Specifically, step S3 includes steps S31 to S33. At step S31, the ECU 5 determines whether or not actual air-fuel ratio has reached an activation air-fuel ratio, and if the result of determination is "no", increases fuel supply to the engine 2 at subsequent step S32. If, on the other hand, the result of determination is "yes" at step S31, the ECU 5 ceases increasing of fuel supply to the engine 2 at step S33. Here, the activation air-fuel ratio is predetermined to be smaller than the air-fuel ratio for staring the engine 1.

To sum up, step S3 increases thermal energy of exhaust gas, namely heat contained in exhaust gas used to warm up the catalytic converter 4, thereby causing early activation of the catalytic converter 4.

At subsequent step S4, the ECU 5 determines whether or not the catalytic converter 5 has become activated. If the result of determination is "yes", the ECU 5 terminates the warming-up of the catalytic converter 4, and at subsequent step S5, starts operating the turbocharger 1 and the engine 2 in a normal operation control mode.

Specifically, step S4 includes steps S41 and S42. At step S41, the ECU 5 determines whether or not the catalytic converter 5 has become activated, from a detection signal from the detector 4s. If the result of determination is "yes", the ECU 5 ceases driving the electric motor 1m and disengages the electromagnetic clutch at step S42.

If, on the other hand, the result of determination at step S41 is "no", the ECU 5 repeats step S3, namely the aforementioned fuel supply control until the result of determination at step S41 changes to "yes".

To sum up, at step S4, as post-processing after completion of activation of the catalytic converter 4, post-processing for switching the operation of the turbocharger 1 and the engine 2 to the normal operation control mode is made.

As clear from the preceding explanation, during the operation in the normal operation control mode at step S5, the power transmission path between the electric motor 1 and the turbine 1t is broken so that the turbine 1t is rotated by kinetic energy of exhaust gas. The ECU 5 controls the amount of fuel supplied to the engine 2 and controls the variable nozzle 1n or the wastegate valve 1w to open or close, according to demanded power output of the engine 2, etc.

Figure 6:
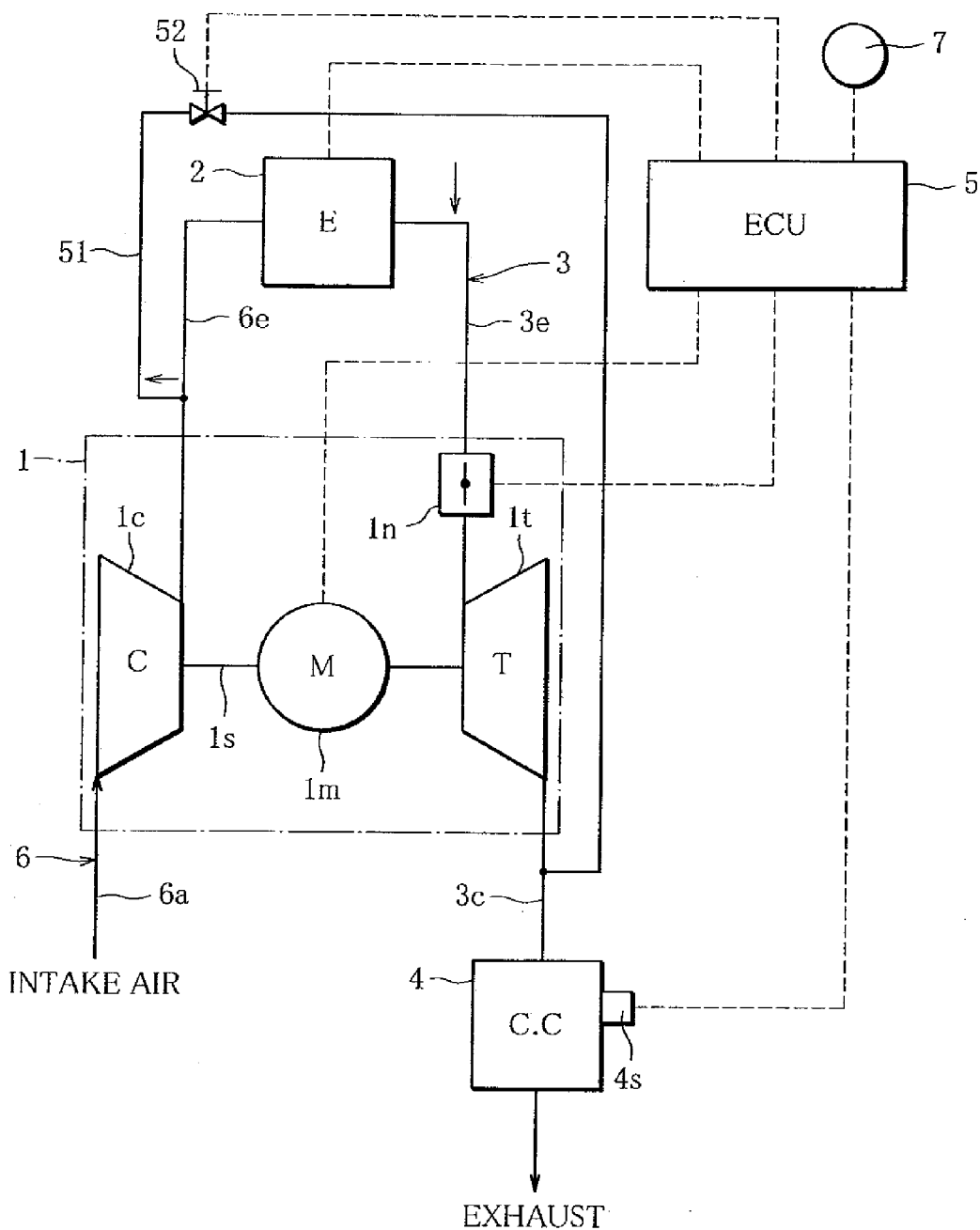
FIG. 6 is a diagram schematically showing a warming-up system according to a third embodiment of the present invention.

FIG. 6 schematically shows a warming-up system according to a third embodiment.

The warming-up system of FIG. 6 includes a bypass passage 51 extending from the downstream section 6e of the intake passage 6. The bypass passage 51 is connected to the downstream section 3c of the exhaust passage 3, between the turbine 1t and the catalytic converter 4. A bypass valve 52 is inserted into the bypass passage 51. The bypass valve 52 is a solenoid valve and electrically connected to the ECU 5 so that the ECU 5 can control the bypass valve 52 to open or close.

When the ECU 5 opens the bypass valve 52 according to optional timing, part of air flowing toward the engine 2 enters the downstream section 3c of the exhaust passage 3 and is supplied to the catalytic converter 4 as secondary air. Because of such secondary air, the catalytic converter 4 is supplied with an increased amount of oxygen, which promotes catalyzed reaction on the catalytic converter 4, resulting in a rise in temperature of the catalytic converter 4.

Although the warming-up system of FIG. 6 includes a variable nozzle 1n, the variable nozzle In may be replaced with a wastegate valve 1w.

Figure 7:
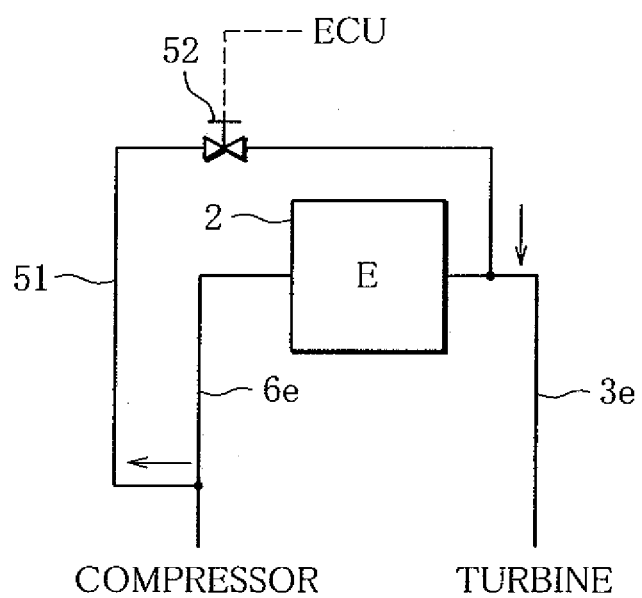
FIG. 7 is a diagram showing part of a warming-up system according to a fourth embodiment of the present invention.

FIG. 7 schematically shows part of a warming-up system according to a fourth embodiment.

Compared with the warming-up system of FIG. 6, the warming-up system of FIG. 7 differs only in that the bypass passage 51 is connected to the upstream section 3e of the exhaust passage 3, between the engine 2 and the turbine 1t.

In the warming-up system of FIG. 7, when the bypass valve 52 is opened according to optional timing, part of air flowing toward the engine 2 enters the upstream section 3e of the exhaust passage 3 as secondary air. Such secondary air is used in combustion of fuel remaining in the exhaust gas, resulting in a rise in exhaust gas temperature, namely an increase in heat contained in the exhaust gas. More specifically, when the engine 2 is started, the ECU 5 sets the air-fuel ratio to a level lower than the stoichiometric air-fuel ratio in order to increase the power output of the engine 2. This results in unburned fuel in exhaust gas of the engine 2. The supply of secondary air easily causes burning of such residual fuel, resulting in a rise in exhaust gas temperature.

Figure 8:
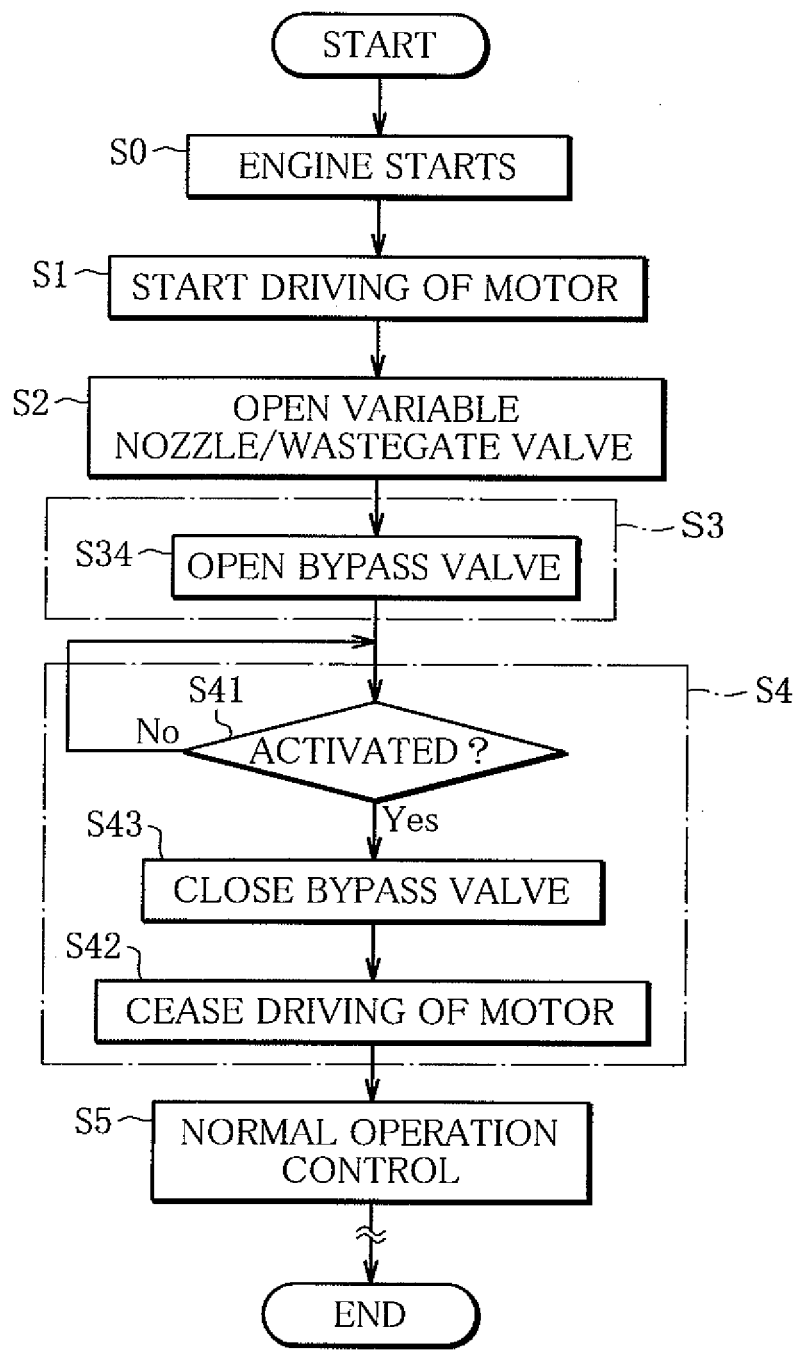
FIG. 8 is a flow chart showing a warming-up method performed by the warming-up system of FIG. 6 or 7.

FIG. 8 shows a flow chart showing a warming-up method applied to the warming-up system of FIG. 6 or 7.

Compared with the flow chart of FIG. 5, the flow chart of FIG. 8 differs only in steps S3 and S4, and thus, only steps S3 and S4 will be described below.

Step S3 of FIG. 8 includes only step S34. At step S34, the ECU 5 opens the bypass valve 51, so that secondary air is supplied to the downstream section 3c of the exhaust passage 3 (in the warming-up system of FIG. 6) or the upstream section 3e of the exhaust passage 3 (in the warming-up system of FIG. 7), resulting in a rise in temperature of the catalytic converter 4 or exhaust gas as mentioned above.

The bypass valve 51 may be practically opened at the same time that steps S1 and S2 are executed. Alternatively, the bypass valve 51 may be opened at the time that the amount of compressed air supplied to the engine 2 is estimated to reach a predetermined level. Specifically, the bypass valve 52 is opened at a predetermined time elapsed after step S1 has executed, or opened when the amount of compressed air supplied to the engine 2 reaches a predetermined level in the case that the amount of compressed air supplied to the engine 2 is measured.

Step S34 causes a rise in temperature of the catalytic converter 4 or the exhaust gas flowing through the catalytic converter 4, and thus, early activation of the catalytic converter 4.

Figure 5:
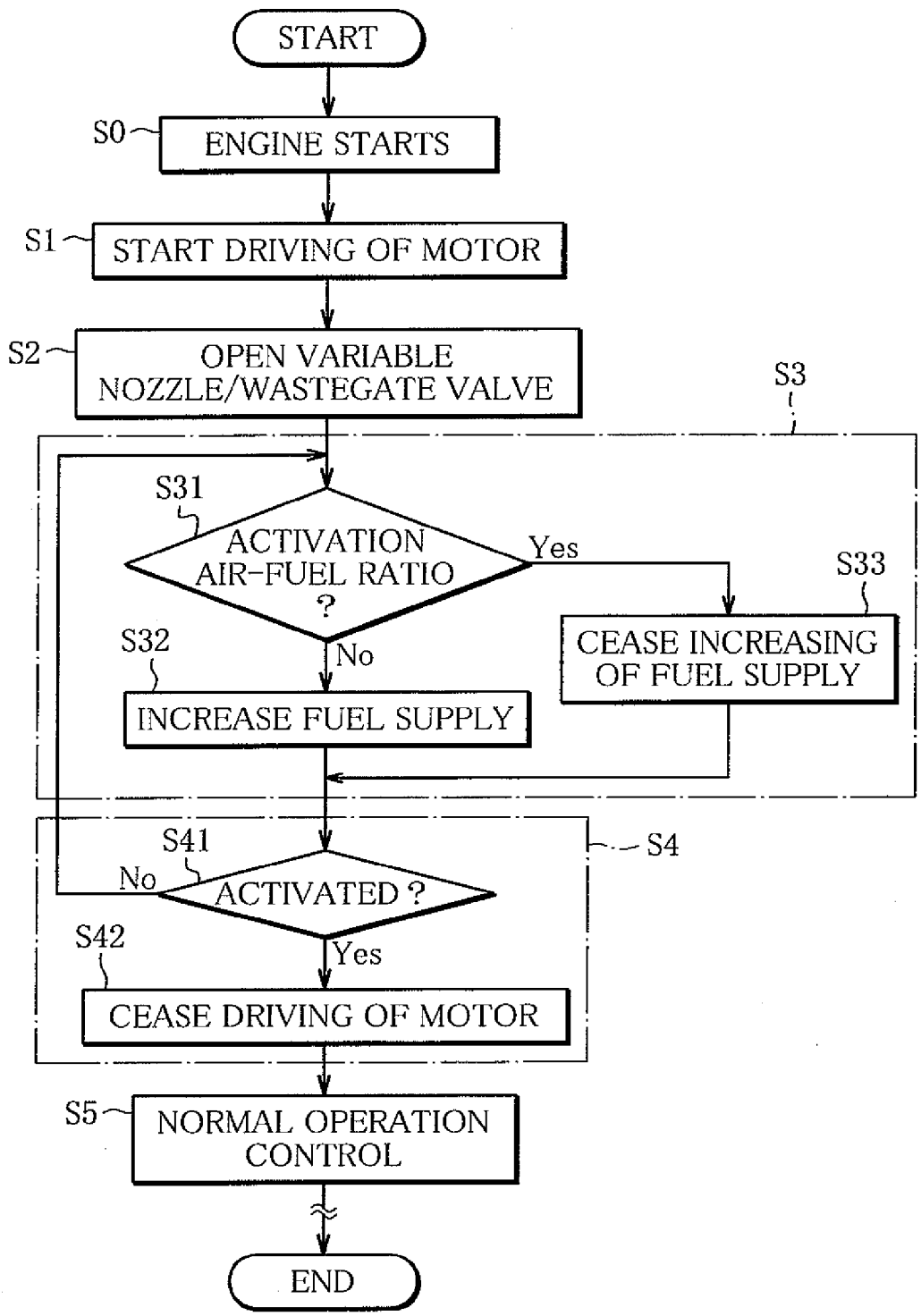
FIG. 5 is a flow chart showing a warming-up method performed by the warming-up system of FIG. 1 or 2.

Compared with step S4 of FIG. 5, step S4 of FIG. 8 differs only in that step S43 is inserted between steps S41 and S42, and that step S41 is repeated until the result of determination at step S41 changes to "yes". When the result of determination at step S41 changes to "yes", namely the catalytic converter 4 is determined to have become activated, the ECU 5 closes the bypass valve 52 (step S43). Consequently, the bypass valve 52 is kept closed during the normal engine 2 operation control (step S5).

Figure 9:
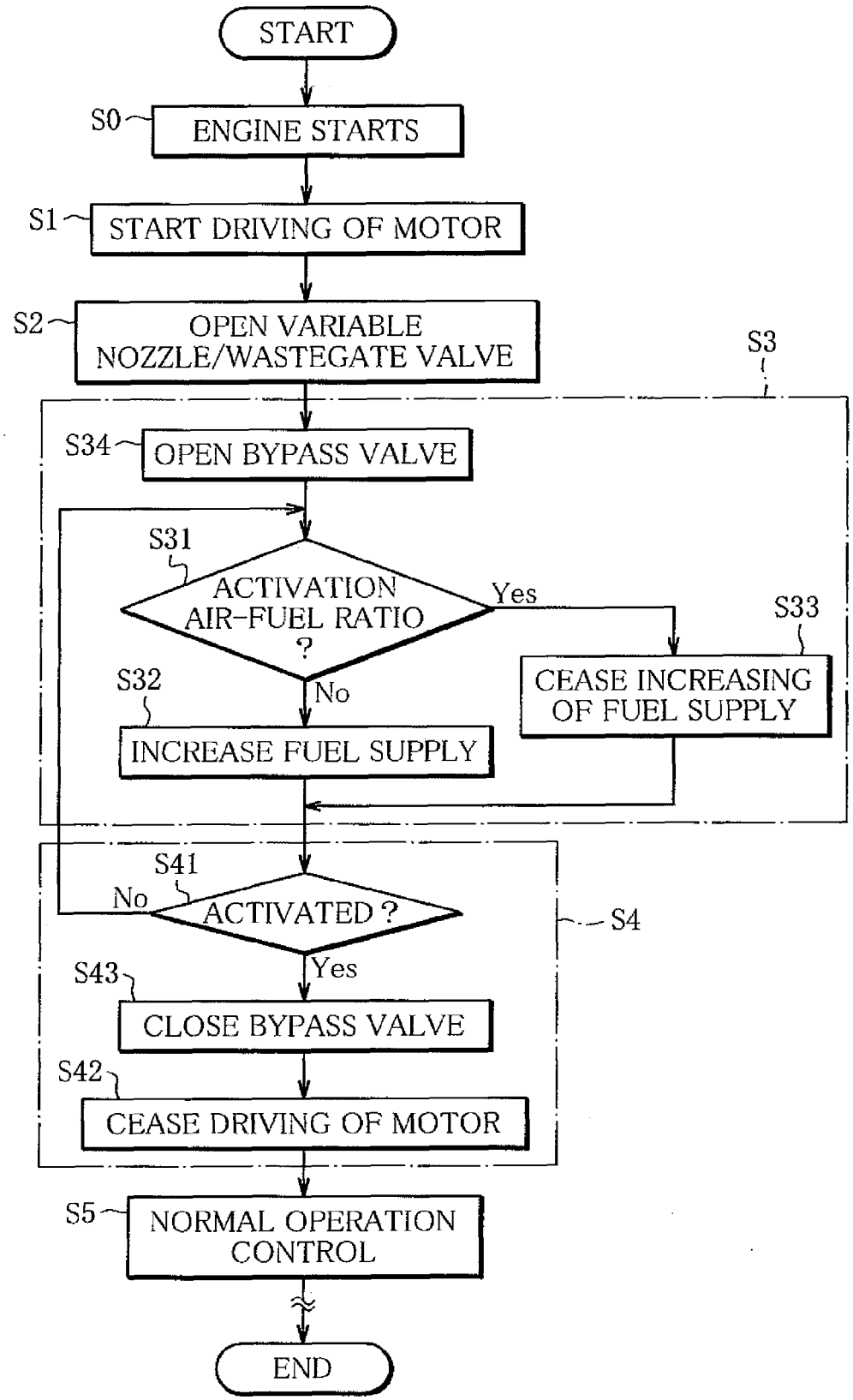
FIG. 9 is a flow chart showing a variant of the warming-up method of FIG. 8.

FIG. 9 is a flow chart showing a variant of the warming-up method of FIG. 8.

Compared with the flow chart of FIG. 8, the flow chart of FIG. 9 differs only in step S3. This difference will be described below.

Step S3 of FIG. 9 includes steps S31 to S33 as in FIG. 5, in addition to step S34. Thus, in addition to a rise in temperature of the catalytic converter 4 caused by step S34, steps S31 to S33 brings an increase in heat contained in the exhaust gas, resulting in a further reduction in the time taken for activation of the catalytic converter 4.

Figure 10:
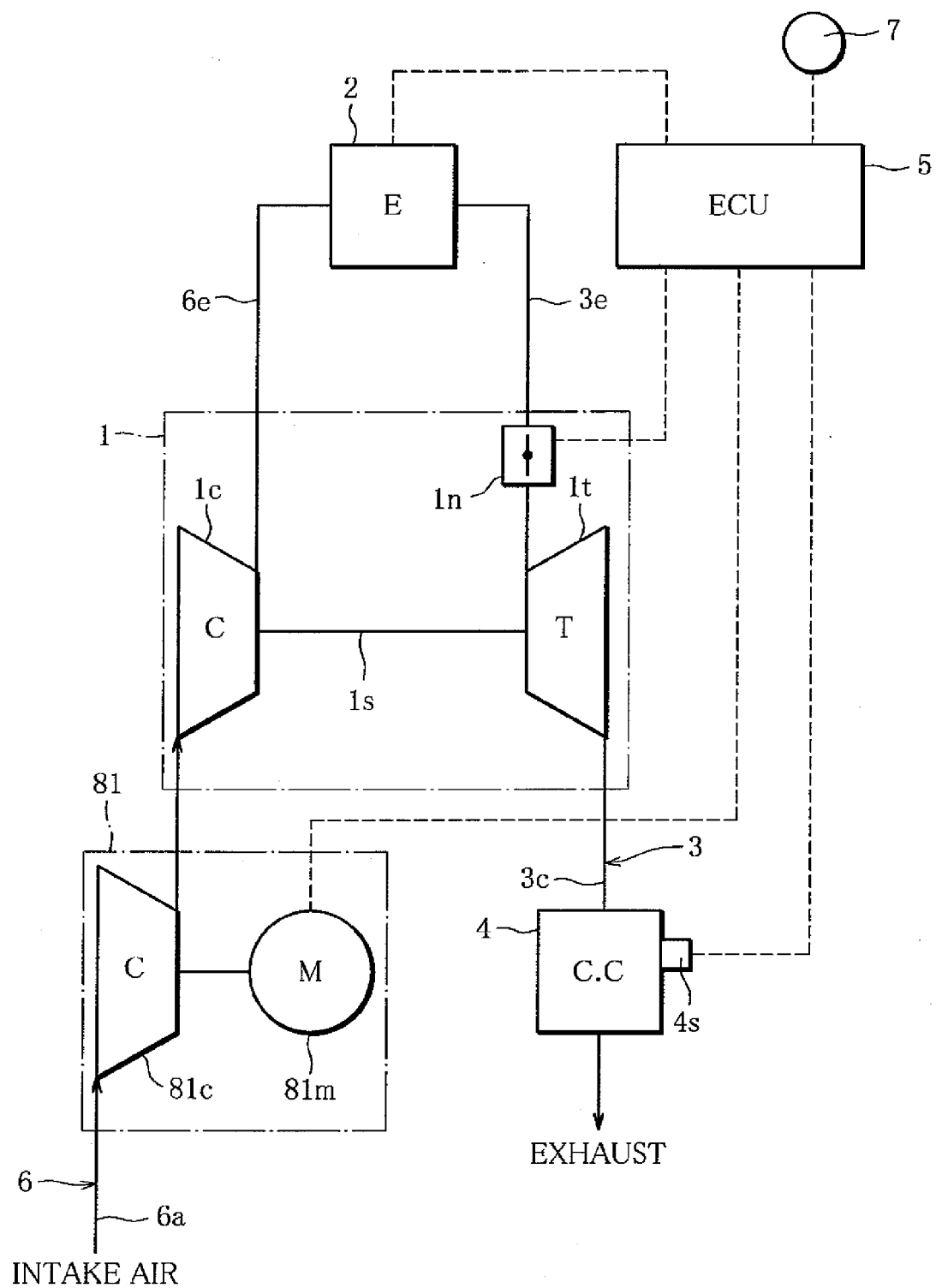
FIG. 10 is a diagram schematically showing a warming-up system according to a fifth embodiment of the present invention.

FIG. 10 schematically shows a warming-up system according to a fifth embodiment.

The warming-up system of FIG. 10 further includes an electric booster 81. The electric booster 81 is arranged in the intake passage 6. Specifically, the electric booster 81 includes a compressor 81c arranged in the upstream section 6a of the intake passage 61 and an electric motor 81m connected to the compressor 81c. The electric motor 81m is electrically connected to the ECU 5 so that the ECU 5 can control the operating of the electric motor 81m (determine whether to drive or stop it, and the revolving speed thereof).

While being driven, the electric booster 81 increases the amount of compressed air supplied to the engine 2, regardless of the amount of exhaust gas flowing through the turbine 1t of the turbocharger 1, and at the same time forcibly drives the compressor 1c and thus the turbine 1t of the turbocharger 1.

The turbocharger 1 of FIG. 10 does not need a drive motor 1m but may include a drive motor 1m redundantly.

The warming-up method applied to the warming-up system of FIG. 10 differs from the above-described warming-up method only in that the drive motor 81m is driven at step S1 in place of the drive motor 1m.

Figure 11:
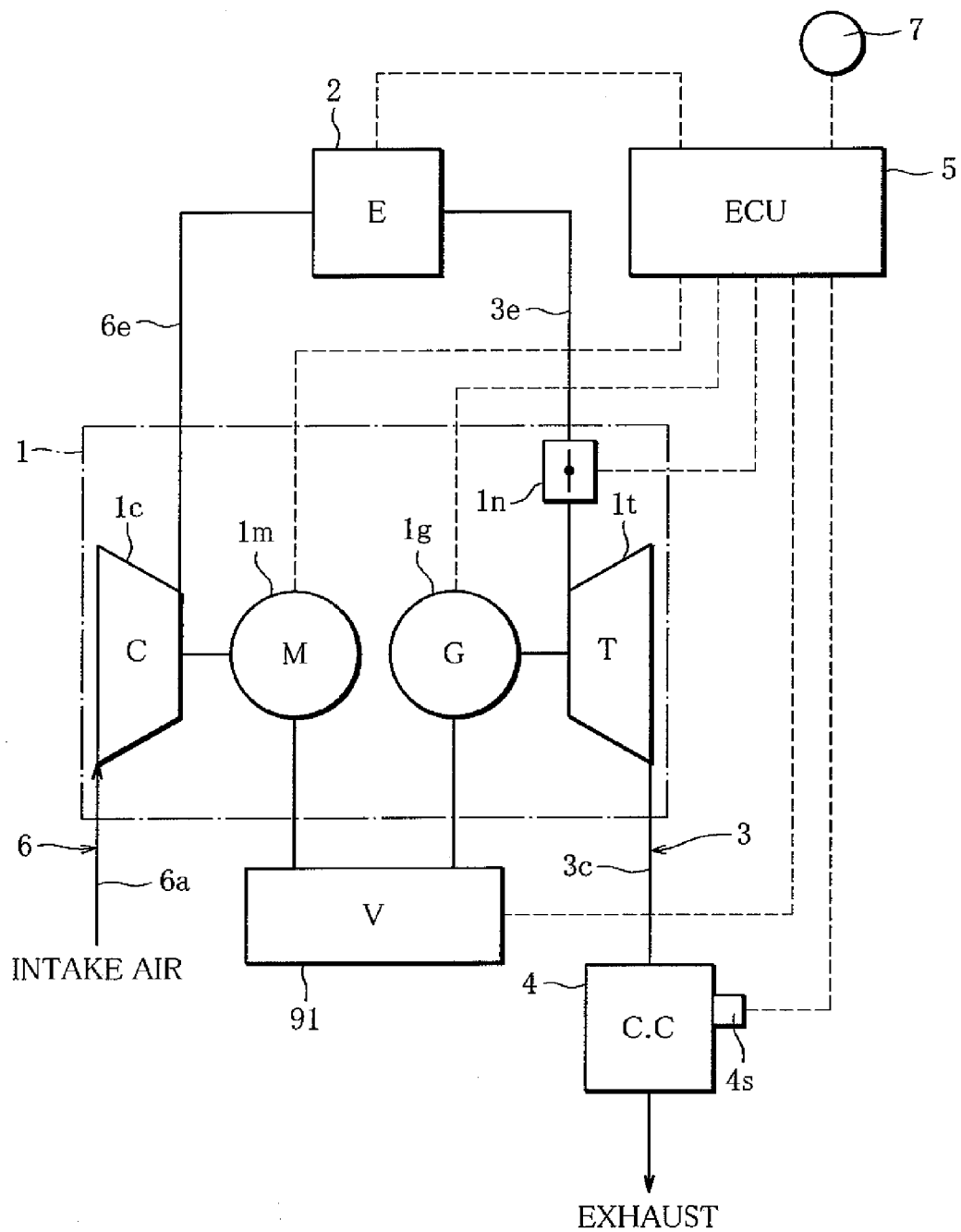
FIG. 11 is a diagram schematically showing a warming-up system according to a sixth embodiment of the present invention.

FIG. 11 schematically shows a warming-up system according to a sixth embodiment.

In the warming-up system of FIG. 11, the turbine 1t and the compressor 1c of the turbocharger 1 are separated. The turbine 1t is connected to an electric generator 1g, and the compressor 1c is connected to an electric motor 1m. The generator 1c and the electric motor 1m are connected to a battery 91. Electricity generated by the generator 1g is charged in the battery 91, and the battery 91 supplies power to the electric motor 1m.

Also in this warming-up system, the compressor 1c driven by the electric motor 1m increases the amount of compressed air supplied to the engine 2 regardless of the amount of exhaust gas flowing through the turbine 1c. It is desirable that during the warming-up of the catalytic converter 4, the generator 1g be placed in a no-load state to minimize the work done by the turbine 1t using the exhaust gas.

The warming-up method applied to the warming-up system of FIG. 11 differs from the above-described warming-up method only in that the generator 1g is placed in a no-load state simultaneously with starting to drive the drive motor 81m at step S1.

The warming-up system of FIG. 11 with the turbine 1t and the compressor 1c separated has greater freedom of arrangement of the turbine 1t and the compressor 1c, and thus greater versatility.

The present invention is not limited to the above-described embodiments. For example, the warming-up systems of FIGS. 10 and 11 can include a mechanism as adopted in the warming-up systems of FIGS. 2, 6 and 7.

EXPLANATION OF REFERENCE CHARACTERS

1: Turbocharger
1t: Turbine
1c: Compressor
1m: Electric motor (intake regulation device)
1n: Variable nozzle (turbine regulation device)
1w: Wastegate valve (turbine regulation device)
2: Engine
3: Exhaust passage
4: Catalytic converter
4s: Detector
5: ECU (exhaust gas regulation device, control device)
6: Intake passage
7: Ignition key switch
51: Bypass passage (exhaust gas regulation device)
52: Bypass valve (exhaust gas regulation device)
81: Electric booster

The invention claimed is:

1. A method of warming up a catalytic converter arranged in an exhaust passage of an internal combustion engine with a turbocharger to clean up exhaust gas, comprising:
   a first step of increasing an amount of air supplied to the internal combustion engine through a compressor of the turbocharger by forcibly driving the turbocharger, regardless of an amount of exhaust gas flowing through a turbine of the turbocharger,
   a second step of regulating the flow of exhaust gas through the turbine, thereby reducing loss of thermal energy which the exhaust gas flowing through the turbine and then toward the catalytic converter undergoes, and
   a third step of increasing fuel supply to the internal combustion engine or supplying oxygen into the exhaust gas, thereby increasing heat contained in the exhaust gas of the internal combustion engine or promoting catalyzed reaction on the catalytic converter.

2. The method of warming up the catalytic converter according to claim 1, wherein said second step opens a variable nozzle or a wastegate valve provided in association with a variable displacement turbocharger.

3. The method of warming up the catalytic converter according to claim 1, wherein said third step increases heat contained in the exhaust gas by increasing fuel supply to the internal combustion engine.

4. The method of warming up the catalytic converter according to claim 1, wherein said third step increases heat contained in the exhaust gas or promotes catalyzed reaction on the catalytic converter by causing part of air to be supplied to the internal combustion engine to flow into the exhaust passage of the internal combustion engine, upstream of the catalytic converter.

5. The method of warming up the catalytic converter according to claim 1, further comprising a fourth step of operating the turbocharger and the internal combustion engine in a normal operation control mode, after the catalytic converter has become activated.

6. A catalytic converter warming-up system for warming up a catalytic converter arranged in an exhaust passage of an internal combustion engine with a turbocharger to clean up exhaust gas, comprising:
   an intake regulation device for increasing an amount of air supplied to the internal combustion engine through a compressor of the turbocharger by forcibly driving the turbocharger, regardless of an amount of exhaust gas flowing through a turbine of the turbocharger,
   a turbine regulation device for regulating the flow of exhaust gas through the turbine, thereby reducing loss of thermal energy which the exhaust gas flowing through the turbine and then toward the catalytic converter undergoes,
   an exhaust gas regulation device for increasing fuel supply to the internal combustion engine or supplying oxygen into the exhaust gas, thereby increasing heat contained in the exhaust gas of the internal combustion engine or promoting catalyzed reaction on the catalytic converter, and
   a control device for controlling operation of the intake regulation device, the turbine regulation device and the exhaust gas regulation device.

7. The catalytic converter warming-up system according to claim 6,
   wherein said turbine regulation device includes a variable nozzle or a wastegate valve, and
   said control device reduces the loss of thermal energy which the exhaust gas flowing toward the catalytic converter undergoes, by opening the variable nozzle or the wastegate valve.

8. The catalytic converter warming-up system according to claim 6, wherein said exhaust gas regulation device increases fuel supply to the internal combustion engine.

9. The catalytic converter warming-up system according to claim 6, wherein
   said exhaust gas regulation device includes a bypass passage connecting an intake passage, which supplies air to the internal combustion engine, and the exhaust passage, and a bypass valve for opening and closing the bypass passage, and said control device opens the bypass valve, thereby causing part of air to be supplied to the internal combustion engine to flow into the exhaust passage to increase heat contained in the exhaust gas of the internal combustion engine or promote catalyzed reaction on the catalytic converter.

10. The catalytic converter warming-up system according to claim 6, further comprising a detector detecting whether or not the catalytic converter has become activated, wherein
when determining that the catalytic converter has become activated, from output of said detector, said control device starts operating the turbocharger and the internal combustion engine in a normal operation control mode.

11. The catalytic converter warming-up system according to claim 6, wherein said intake regulation device includes an electric motor connected to the turbocharger or an electric booster arranged upstream of the turbocharger in an intake passage, the electric booster being adapted to increase the amount of air supplied to the internal combustion engine.

* * * * *